US008839291B1

(12) United States Patent
Anderson et al.

(10) Patent No.: US 8,839,291 B1
(45) Date of Patent: *Sep. 16, 2014

(54) ESTIMATING DEMOGRAPHIC COMPOSITIONS OF TELEVISION AUDIENCES FROM AUDIENCE SIMILARITIES

(71) Applicant: Google Inc., Mountain View, CA (US)

(72) Inventors: Per R. Anderson, Corona Del Mar, CA (US); Diane Lambert, Berkeley Heights, NJ (US); Daniel J. Zigmond, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/869,164

(22) Filed: Apr. 24, 2013

Related U.S. Application Data

(63) Continuation of application No. 13/077,493, filed on Mar. 31, 2011, now Pat. No. 8,453,173.

(60) Provisional application No. 61/422,576, filed on Dec. 13, 2010.

(51) Int. Cl.
| | |
|---|---|
| *H04H 60/33* | (2008.01) |
| *H04H 60/45* | (2008.01) |
| *H04N 7/10* | (2006.01) |
| *H04N 7/025* | (2006.01) |
| *H04N 7/173* | (2011.01) |
| *G06Q 30/00* | (2012.01) |
| *G06F 17/00* | (2006.01) |
| *G06N 5/00* | (2006.01) |
| *G06N 5/02* | (2006.01) |
| *G06N 7/00* | (2006.01) |
| *G06N 7/08* | (2006.01) |
| *H04N 21/442* | (2011.01) |

(52) U.S. Cl.
CPC .................... *H04N 21/442* (2013.01)
USPC ........ 725/35; 725/9; 725/11; 725/32; 725/34; 725/36; 725/114; 725/115; 725/116; 705/14.25; 705/14.4; 705/14.41; 705/14.52; 705/14.53; 705/14.66; 706/45; 706/46; 706/47; 706/55; 706/56

(58) Field of Classification Search
USPC ............................ 725/9–21, 32–36, 114–116
See application file for complete search history.

(56) References Cited

U.S. PATENT DOCUMENTS

| | | | |
|---|---|---|---|
| 5,550,928 A | 8/1996 | Lu et al. | |
| 7,117,518 B1 * | 10/2006 | Takahashi et al. | ............... 725/86 |
| 7,895,626 B2 | 2/2011 | Georgis et al. | |
| 7,962,935 B2 * | 6/2011 | Kurosaki et al. | ............... 725/40 |
| 8,001,561 B2 * | 8/2011 | Gibbs et al. | ................... 725/14 |

(Continued)

OTHER PUBLICATIONS

Claritas, "PRIZM NE Segments" [online] [retrieved Aug. 12, 2011], 3 pages.

(Continued)

*Primary Examiner* — Mushfikh Alam
(74) *Attorney, Agent, or Firm* — Fish & Richardson P.C.

(57) ABSTRACT

Methods, systems, and apparatus, including computer programs encoded on a computer storage medium, for estimating demographic compositions of television audiences from audience similarities. In an aspect, pairwise cosine similarities of segment of viewers of rated and unrated television programs are determined, demographic information of rated programs is attributed to the unrated programs from the cosine similarity measures and demographic information for the rated programs.

20 Claims, 6 Drawing Sheets

(56) References Cited

U.S. PATENT DOCUMENTS

| | | |
|---|---|---|
| 2006/0293954 A1 | 12/2006 | Anderson et al. |
| 2007/0240180 A1* | 10/2007 | Shanks et al. .................. 725/14 |
| 2007/0288953 A1 | 12/2007 | Sheeman et al. |
| 2009/0055268 A1* | 2/2009 | Knoller et al. ................. 705/14 |
| 2009/0133058 A1* | 5/2009 | Kouritzin et al. .............. 725/34 |
| 2009/0150224 A1* | 6/2009 | Lu et al. .......................... 705/10 |
| 2009/0187932 A1* | 7/2009 | Rathburn et al. ................. 725/9 |
| 2009/0288109 A1* | 11/2009 | Downey et al. ................. 725/14 |
| 2010/0083318 A1* | 4/2010 | Weare et al. .................... 725/46 |
| 2010/0138290 A1* | 6/2010 | Zschocke et al. .......... 705/14.41 |
| 2010/0211439 A1* | 8/2010 | Marci et al. .................... 705/10 |
| 2010/0223215 A1* | 9/2010 | Karypis et al. ................. 706/12 |
| 2010/0223641 A1* | 9/2010 | Hubbard ........................ 725/35 |
| 2010/0280881 A1* | 11/2010 | Faith et al. ..................... 705/10 |
| 2010/0324992 A1* | 12/2010 | Birch ........................ 705/14.49 |
| 2010/0332331 A1* | 12/2010 | Etchegoyen ............... 705/14.69 |
| 2011/0015989 A1* | 1/2011 | Tidwell et al. ............. 705/14.43 |
| 2012/0260278 A1 | 10/2012 | Lambert et al. |

OTHER PUBLICATIONS

Nielsen, "Television Measurement" [online] [retrieved Aug. 12, 2011], 2 pages.

Rosenberg, Matt "You Are Where You Live," About.com [online] [retrieved Aug. 12, 2011], 1 page.

Wikipedia.com "Nielsen ratings" [online] [retrieved Aug. 12, 2011], 9 pages.

Zigmond et al., U.S. Appl. No. 13/277,827, filed Oct. 20, 2011, 34 pages.

* cited by examiner

ESTIMATING DEMOGRAPHIC COMPOSITIONS OF TELEVISION AUDIENCES FROM AUDIENCE SIMILARITIES

CROSS REFERENCE TO RELATED APPLICATION

This application is a continuation of U.S. patent application Ser. No. 13/077,493, entitled "Estimating Demographic Compositions Of Television Audiences From Audience Similarities," and filed on Mar. 31, 2011, which claims the benefit under 35 U.S.C. §119(e) of U.S. Application No. 61/422,576, titled "Estimating Demographic Compositions Of Television Audiences From Audience Similarities," and filed on Dec. 13, 2010, the entire disclosures of which are incorporated herein by reference.

BACKGROUND

This disclosure relates to determining demographics of a program audience. Advertisers often set exposure goals for advertising campaigns for advertising content, e.g., television ads, and devise strategies to achieve these goals, e.g., when to air the advertising campaign content. Accordingly, advertisers are very interested in knowing the number of viewers in program audiences and the demographics of program audiences, e.g., the percentage of male and female viewers for a given program, and the age distributions of the male and female viewers.

The number of viewers of a television program can be determined in a variety of ways. For example, viewing device logs, such as set top box logs that include channel tune records, can be analyzed to determine the number of set top box devices tuned to particular television programs at particular times. Additionally, some device logs also include segment information, e.g., data that describe segments based on behavioral, demographic and location characteristics of a viewing audience. For example, some households may be categorized to one or more segment clusters (e.g., Equifax demographic interest clusters or Nielsen PRIZM clusters) that describe the segments of the viewers. Typically the segment data are generated by a process that is different from the process that is used to generate ratings data for television programs, i.e., the segment data are determined independently from the ratings data.

Panels or surveys can also be used to estimate the number of viewers by demographic group using panels or surveys. However, it is sometimes impractical to sample enough households to determine the audience composition for every particular television program. Accordingly, while some ratings information may be available for particular television programs, the programs may still be unrated with respect to demographics.

SUMMARY

In general, one innovative aspect of the subject matter described in this specification can be embodied in methods that include the actions of accessing ratings data describing, for each of a plurality of first channel time blocks, demographic characteristics of a viewing audience of the channel time block; accessing segment data describing, for each of the plurality of first channel time blocks and a plurality of second channel time blocks for which demographic characteristics are not described by the ratings data, segment characteristics of a viewing audience of the channel time blocks; for each of the second channel time blocks: determining, from the segment data, respective similarity measures that measure the similarity of the second channel time block to each of the first channel time blocks, selecting first channel time block, and determining estimated ratings data describing demographic characteristics of a viewing audience of the second channel time block from the respective similarity measures and the demographic characteristics of the selected first channel time blocks. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Audience demographics can be determined for demographically unrated television programs by leveraging off the demographic rating information of other television programs by an automated process, which reduces the cost associated with determining demographics of demographically unrated television programs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
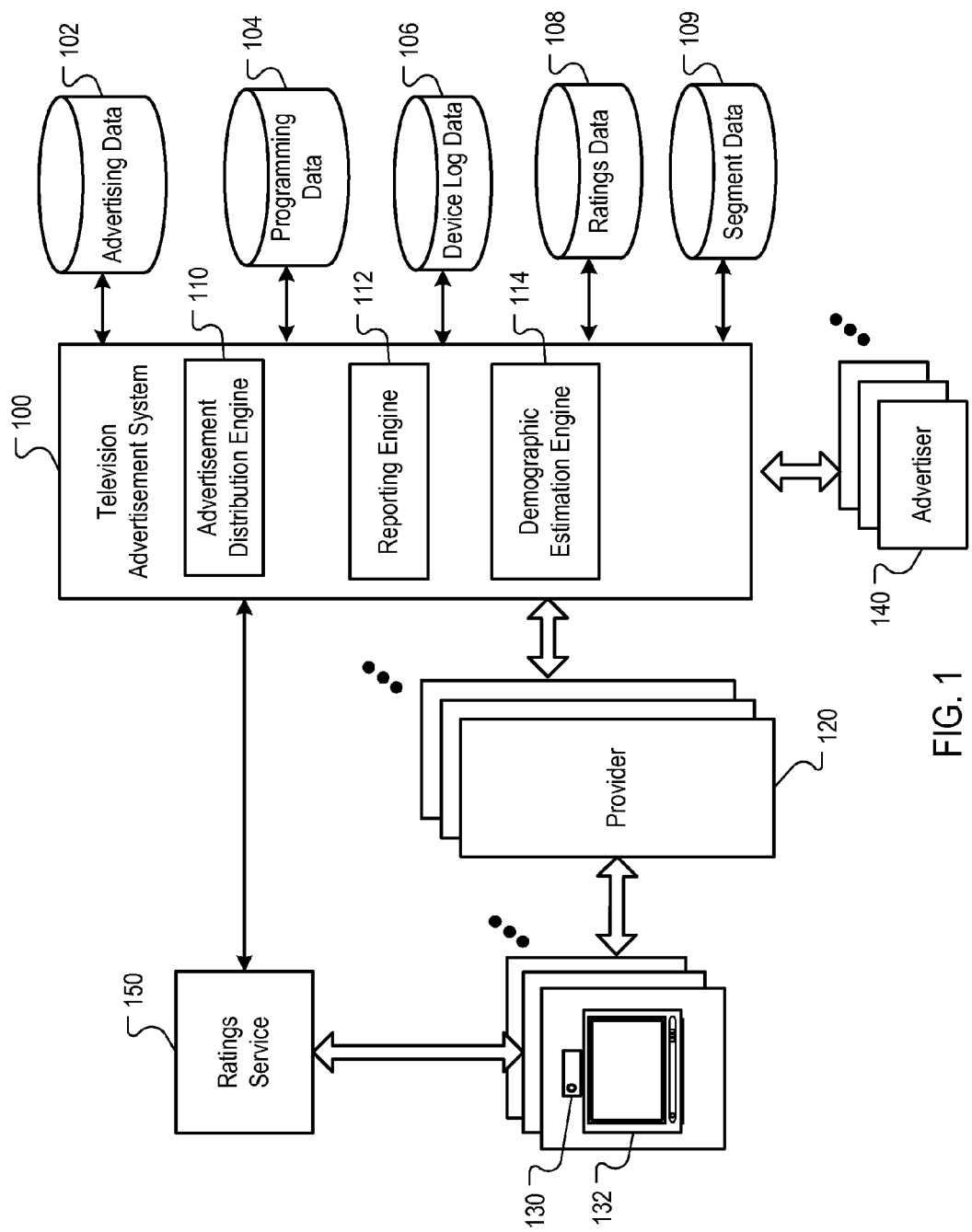
FIG. 1 is a block diagram of an example television advertisement system.

FIG. 1 is a block diagram of an example television advertisement system 100. Television advertisement system 100 delivers advertising campaign content, e.g., television ads/creatives, to an advertising population to facilitate operator monetization of programming and quantification of content delivery to target markets. The advertisement can be shown separately from a television program in the form of a television commercial, or can be shown concurrently with a television program in the form of an overlay or text stream on a portion of a television display.

The television advertisement system 100 is typically implemented in computer servers, and can provide and receive data over a network. Example networks include local area networks (LANs), wide area networks (WANs), telephonic networks, and wireless networks. Additionally, the television advertisement system 100 can, for example, communicate over several different types of networks, e.g., the Internet, a satellite network, and a telephonic network.

In general, the television advertisement system 100 receives television advertisements and campaign data from advertisers 140. An advertiser is entity that provides television advertisements, such as a commercial entity that sells products or services, an advertising agency, or a person. The television advertisement system 100 facilitates the provisioning of television advertisements to television providers 120. A television provider is an entity that facilitates the delivery of a television broadcast (e.g., the programming of a television network) to viewers, such as cable provider, a digital satellite provider, a streaming media provider, or some other media provider.

The television advertisement system 100 can also obtain viewing information related to viewing devices 130. Example viewing devices 130 include set top boxes, digital video recorders and tuners, and other television processing devices that facilitate the viewing of the television signal on a television device. In some implementations, logs related to viewing device 130 activity, e.g., set top box logs, can be anonymized to remove personal information related to viewing activities by the television advertising system or prior to being provided to the television advertisement system 100. In some implementations, users of the set top box devices may opt out of the log collection process so that their viewing habits are not disclosed to any third party.

The viewing information can be provided by the television providers 120, or can be provided by third parties. In the example system 100 of FIG. 1, the viewing information is provided in the form of set top box logs from the television providers 120.

Additionally, the viewing devices 130, or the television advertisement system 100, can also provide segment information, e.g., data that describe segment characteristics of a viewing audience, corresponding to each set top box log. For example, each set top box log can be associated with segment information that describes the interest, behavior and location characteristics of a household in which the viewing device 130 is located.

The system 100 can also receive data from a ratings service 150. A ratings service 150 is an entity that gathers ratings information, including demographic information, from households. The ratings service 150 implements an audience measurement system to determine the audience size and composition (demographics) of television programming. Example audience measurement systems include viewer diaries, a system in which a target audience records it viewing history and provides the viewing history to the ratings service 150. Another example involves the user of set meters that gather the viewing history of a household and transmit the history data to the service 150 on a periodic basis (e.g., daily). Other audience measurement system can also be used to generate ratings information that includes demographic data.

The television advertisement system 100 also includes one or more data stores to store set top box log data, ratings data, television advertisements and associated advertisement data. In some implementations, the television advertisement system 100 includes a television advertisement data store 102, a programming data store 104, a device log data store 106, a ratings data store 108, and an segment data store 109.

The television advertisement data store 102 stores data defining television advertisements that can be broadcast or aired during an advertisement spot. Example television advertisements include video advertisements, banner advertisements, overlay advertisements, etc. The advertisement data store 102 also includes advertising campaign information for multiple advertisers. An advertising campaign describes an ad or a group of related ads, and conditions for airing the advertisement.

The programming data store 104 stores programming schedules and advertisement avails. The advertisement distribution engine 110 uses the programming schedules and advertisement avails to auction and schedule advertisements.

The device log data store 106 can include, for example, data logs/television reporting data from viewing devices 130, e.g., set top boxes, satellite receivers, etc. The log data store 106 can store reporting data that include channel identifiers, e.g., channel tune records, identifying channels for programming that was presented on televisions 132 by use of the viewing devices 130, such as may occur when the viewing device 130 is processing video data to record and/or display. The log data store 106 can also store reporting data that include device time data identifying times and/or durations at which (or with which) a viewing device was used to present the programming of the channels; and device identifiers identifying the viewing devices 130. The log data can be anonymized to protect individual users, through, for example, removal of personally identifying information, demographic aggregation of data, anonymization of user identifiers and/or device identifiers, and the like.

The ratings data 108 stores ratings data for channel time blocks. For each channel time block, the ratings data describes the demographics of a viewing audience of the channel time block. For many channel time blocks the ratings data 108 are received from the ratings service. However, as described above, it is often impractical for the ratings service 150 to sample enough people to determine the audience composition for every particular television program. Accordingly, while ratings information in terms of the number of viewers may be available for many channel time blocks, many of the channel time blocks are nevertheless unrated with respect to demographics. As will be described in more detail below, a demographic estimation engine 114 can determine a demographic composition of an audience of an unrated channel time block from the demographics of one or more rated channel time blocks.

As used herein, the term "channel time block" refers to an identifiable broadcast for a time period. Thus, a channel time block can refer to a television program that aired on a particular network at a particular time, or can refer to a particular provider channel (and thus a network) for a particular block of time, e.g., 15 minute intervals. Thus, the ratings data describes demographic characteristics of a viewing audience each of the demographically rated channel time blocks.

The segment data store 109 stores segment data that describes segment characteristics of a viewing audience of the channel time blocks. As described above, the segment data can be data that categorizes an audience member or household into one or more segment categories. Because the segment data can be provided independent from the ratings data, the segment data stores information for the rated channel time blocks for which demographic characteristics are also provided by the ratings data, and also stores information for channel time blocks for which demographic characteristics are not described by the ratings data.

In addition to the demographic estimation engine 114, the television advertisement system 100 also includes an advertisement distribution engine 110 and a reporting engine 112. The advertisement distribution engine 110 is configured to provide approved advertisements to the television provider 120. In some implementations, the advertisements are provided to the television provider 120 in advance of airing the advertisements. In some implementations, after receiving a request for any new advertisements to be downloaded for airing by the provider 120, the television advertisement system 100 labels the download with a particular ID that can be used later to identify the advertisement and the distribution engine 110 can deliver the advertisement to the appropriate provider 120.

The reporting engine 112 can, for example, receive advertisement reporting information from the provider 120 and determine whether the selected television advertisement aired based on the advertisement report information (an advertisement may not air due to a programming irregularity, e.g., a sporting event going beyond a scheduled broadcast, an interruption to scheduled programming due to breaking news), and generate reports from the reporting information. The reports can include impressions and demographics of the viewing audiences.

The reporting engine 112 accesses the advertising data 102, programming data 104, device log data 106 and the ratings data 108 and, using this information, creates associations between the device identifiers, the channel identifiers and the device time data to identify the time blocks in which each viewing device 130 was used to present programming on the channel corresponding to the time block, and the duration each viewing device was used to present the programming for the channel associated with that time block.

The reporting engine 112 determines the number of impressions for each airing of an advertisement. The impressions can, for example, be measured statistically. An impression can be a household impression, e.g., the airing of an advertisement in household and independent of the number of televisions in a household. If the advertisement is aired on a viewing device in the household, one household impression can be recorded. In other implementations, impressions can be measured by an analysis of activity logs of the viewing devices 130. For example, a household may have three viewing devices 130, and at a given time two of the devices may be tuned to a first channel and the third device may be tuned to a second channel. If a first commercial airs on the first channel and a second commercial airs on the second channel during a time that the logs for the viewing devices 130 indicated that the viewing devices are tuned to the channels, impressions can be generated for each viewing device.

For channel time blocks that have been rated by the ratings service 150, the system 100 can determine ratings information from the ratings data 108 received from the rating service 150. Such information can include the number of viewers in the viewing audience of the channel time blocks, and the demographic composition of the viewing audience for each channel time block. However, many of the channel time blocks do not have demographic rating information available for them. This can be due to an insufficient number of viewers that watched a channel time block for the rating service 150 to determine a demographic composition with the required level of certainty, or for other reasons. For television programs for which the rating service 150 did provide demographic rating information, e.g., demographic data with an acceptable level of certainty, or, if certainty is not determined, any recorded demographic data, the demographic estimation engine 114 can estimate demographic composition of a television audience for a demographically unrated channel time block from the segment information for the rated channel time blocks.

Figure 2:
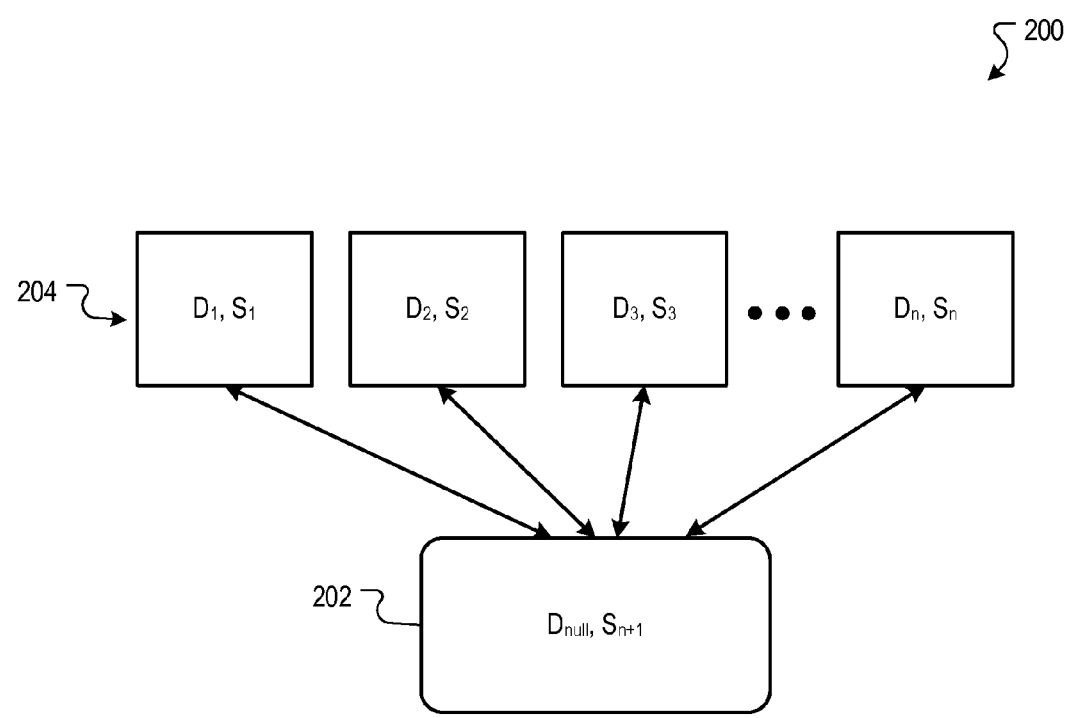
FIG. 2 is a block diagram illustrating an estimation of a demographic composition of a television audience from audience similarities.

The process by which the demographic estimation engine 114 determines the demographic composition of television audiences for unrated channel time blocks is better understood with reference to FIG. 2, which is a block diagram illustrating an estimation of a demographic composition of a television audience from audience similarities.

The demographic estimating engine 114 identifies channel time blocks for which the demographics of a viewing audience are not reliably specified in the ratings data 108, i.e., for which the demographic characteristics are not described by the ratings data. For example, for certain channel time blocks the ratings data 108 received from the ratings service 150 may not include demographic data, or may include demographic data that is determined to be unreliable, e.g., demographic data derived from a very small sample set. As shown in FIG. 2, for example, the demographic estimation engine 114 identifies an unrated channel time block 202. The notation $D_{null}$ indicates that the channel time block is demographically unrated, i.e., no demographic ratings information is available, or the information for the channel time block is determined to be unreliable. However, the channel time block does have associated segment information, as indicated by the notation $S_{n+1}$.

The demographic estimation engine 114, however, has access to demographics of viewing audiences of numerous other channel time blocks for which demographic data are available. For example, the channel time blocks 202 are channel time blocks for which demographic ratings data related to male and female viewership are available. Additionally, each of the channel time blocks 202 have associated segment data.

In some implementations, the demographic estimation engine 114 estimates the demographic composition of the channel time block 202 from the similarity of the segments of the viewing audience of the channel time block 202 to the viewing audiences of the of the channel time blocks 204 and from the demographic characteristics of the channel time blocks 204.

Figure 3:
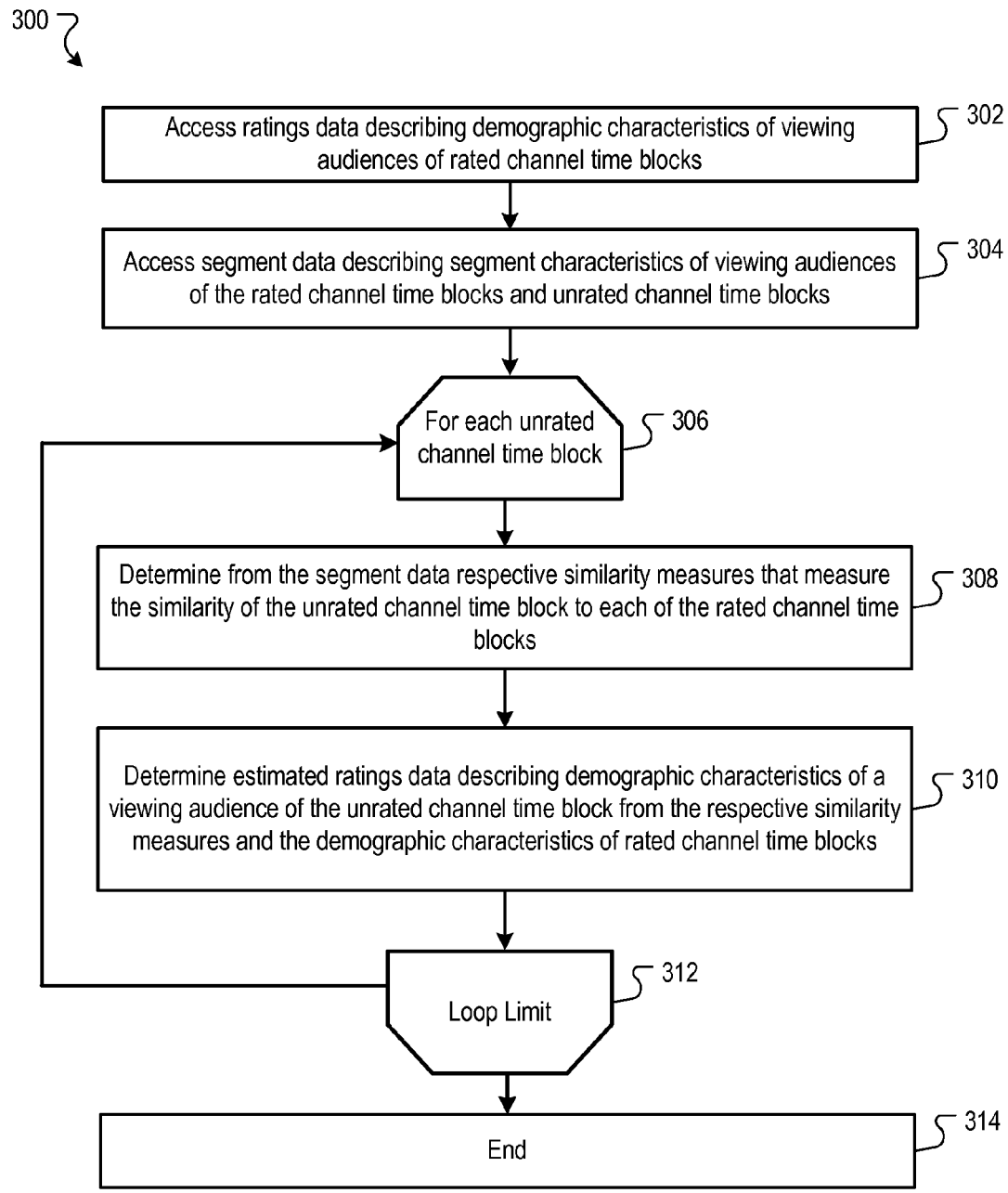
FIG. 3 is a flow diagram of an example process for estimating demographics for a demographically unrated channel time block.

An example process by which the demographic estimate engine 114 estimates the demographic composition of a demographically unrated channel time block is described with reference to FIG. 3, which is a block diagram of an example process 300 for estimating demographics for a demographically unrated channel time block.

The process 300 can be implemented by a data processing apparatus (e.g., one or more computers) and software stored on a computer storage apparatus that includes instructions executable by the data processing apparatus.

The process 300 accesses ratings data describing demographic characteristics of viewing audiences of rated channel time blocks (302). For example, the demographic estimation engine 114 accesses the ratings data stored in the ratings data store 108, which stores ratings data describing demographic characteristics of a viewing audience first channel time blocks. Each of the first channel time blocks is demographically rated.

The process 300 accesses segment data describing segment characteristics of viewing audiences of the rated channel time blocks and unrated channel time blocks (304). For example, the demographic estimation engine 114 accesses the segment data stored in the segment data store 109, which describes, for each channel time block, segment characteristics of a viewing audience of the channel time block. The channel time blocks include the first channel time blocks and second channel time blocks. The second channel time blocks are demographically unrated channel time blocks for which demographic characteristics are not described by the ratings data.

For each of the unrated channel time blocks (306), the process 300 determines, from the segment data, respective similarity measures that measure the similarity of the unrated channel time block to each of the rated channel time blocks. As will be described with respect to FIGS. 4 and 5, in some implementations, the similarity measure can be a pairwise cosine similarity of vectors that each represents the segment characteristics for a respective channel time block.

The process 300 determines estimated ratings data describing demographic characteristics of a viewing audience of the unrated channel time block from the respective similarity measures and the demographic characteristics of the rated channel time blocks (310). For example, for each demographic to be determined, the process 300 determines, for each of the rated channel time blocks, a product of the similarity measure that measures the similarity of the rated channel time block to the unrated channel time block and the demographic measure of the rated channel time block. The products are then summed for the demographic and attributed to the unrated channel time block. Equation (1) describes one example estimation formula:

$$D_{UCTB} = \Sigma(\text{Sim}(UCTB, CTB_i) * D_{CTBi}) / \Sigma \text{Sim}(UCTB, CTBi) \quad (1)$$

Where $D_{UCTB}$ is the estimated demographic of the unrated channel time block (UTCB);

Sim(UCTB, CTB) is the similarity metric that measures the similarity, based on the segment data, of the unrated channel time block to the rated channel time block i; and $D_{CTBi}$ is a value proportional to a number of viewers (e.g., an actual viewer number or household number) having the demographic characteristic D for the rated channel time block i.

In some implementations, the similarity measures are cosine similarity measures, and the segment data and ratings data are used to generate vectors for the channel time blocks. The vectors are represented by two matrices, the first corresponding to the segment data and used to generate the cosine similarity measures, and the second corresponding to the ratings data and used to store values representing the demographic characteristics of viewing audiences of channel time blocks. For example, the demographic estimation engine 114 generates an segment matrix including rows indexed by the first (rated) and second (unrated) channel time blocks, and columns indexed by the segment characteristics. Each cell defined by an intersection of a column and a row stores a value V proportional to a number of viewers having the segment characteristic of the column that are determined to have viewed the channel time block indexing the row.

For example, for M channel time blocks and N segment characteristics, the following matrix is generated:

|       | $S_1$    | $S_2$    | ... | $S_n$    |
|-------|----------|----------|-----|----------|
| $CTB_1$ | $V_{11}$ | $V_{12}$ |     | $V_{1n}$ |
| $CTB_2$ | $V_{21}$ | $V_{22}$ |     | $V_{2n}$ |
| .     |          |          |     |          |
| .     |          |          |     |          |
| $CTB_m$ | $V_{m1}$ | $V_{m2}$ |     | $V_{mn}$ |

Likewise, the demographic estimation engine 114 generates a demographic matrix including rows indexed by the first (rated) channel time blocks and columns indexed by the demographic characteristics. Each cell defined by an intersection of a column and a row stores a value V proportional to a number of viewers having the demographic characteristic of the column that are determined to have viewed the first channel time block indexing the row. For example, for j rated channel time blocks and k demographics, the following matrix is generated:

|       | $D_1$    | $D_2$    | ... | $D_k$    |
|-------|----------|----------|-----|----------|
| $CTB_1$ | $V_{11}$ | $V_{12}$ |     | $V_{1k}$ |
| $CTB_2$ | $V_{21}$ | $V_{22}$ |     | $V_{2k}$ |
| .     |          |          |     |          |
| .     |          |          |     |          |
| $CTB_j$ | $V_{j1}$ | $V_{j2}$ |     | $V_{jk}$ |

The values V in the segment matrix may differ from the values V in the in the demographic matrix, as the data sources and attribution conditions for each data set differ. Additionally, the channel time blocks $CTB_1$-$CTB_m$ indexing the segment matrix include some (or all) of the channel time blocks $CTB_1$-$CTB_j$ indexing the demographic matrix, and addition channel time blocks for which demographic characteristics are not described by the ratings data.

Each row in the segment matrix constitutes a vector of segments for the channel time block indexing the row. Thus, in some implementations, the similarity measures that measure the similarity of the second channel time block to each of the first channel time blocks are cosine similarity measures from the row indexed by the second channel time block and each respective row indexed by the first channel time blocks. For example, suppose channel time block $CTB_m$ is an unrated channel time block, and channel time blocks $CTB_1$-$CTB_{m-1}$ are rated channel time blocks. In this scenario, up to M–1 similarity measures are determined according to equation 2, where i=1 ... m–1:

$$\text{sim}(CTB_i, CTB_m) \equiv \frac{CTB_i \cdot CTB_m}{\|CTB_i\|\|CTB_m\|} \quad (2)$$

The numerator of equation (2) is the dot product of two segment vectors, and the denominator is the product of the magnitudes of the two segment vectors. Additionally, in some implementations, each vector is normalized to have a length of 1.

After the similarity scores are determined, each demographic characteristic for the unrated channel time block $CTB_m$ is determined according to equation (1) above. In some implementations, the similarity values are normalized from 0 to 1 before the products are determined.

In some situations, summing demographic characteristics from many channel time blocks may result in a regression to the mean of the demographic characteristic. In particular, most rated network programming is designed to appeal to a wide audience, and thus any average of rated network demographics is likely to be pulled towards the mean, even if these networks are dissimilar. In other words, a preponderance of small weights will dominate and the weighted average will approach the wider audience. Such an average, however, will likely be incorrect for unrated channel time blocks that are viewed by a particular niche audience.

In some implementations, the effect of this phenomenon is reduced by precluding some of the channel time blocks for each particular demographic characteristic from being used to estimate demographic characteristics for unrated channel time blocks. The demographic estimation engine 114 determines, for each column in the demographic matrix, a central tendency of the demographic characteristic values. One example central tendency is a median value. Other central tendency values (e.g., the mean) can also be used.

Thereafter, the channel time blocks having a demographic characteristic value that meet a threshold with respect to the central tendency value of the column are precluded from being used to estimate demographic characteristics for unrated channel time blocks. As used herein, "meeting a threshold" with respect to a central tendency value means that a value meets a filtering condition with respect to the central tendency value. One example filtering condition is the value being included in a portion of the values of other channel time blocks having column values closest to the median value, e.g., 40%, 50%, 60% of the values closest to the median value. Another example filtering condition is the value being within a given percentage magnitude of the median value, e.g., +/-10%, or some other percentage. Other threshold conditions can also be used.

Figure 4:
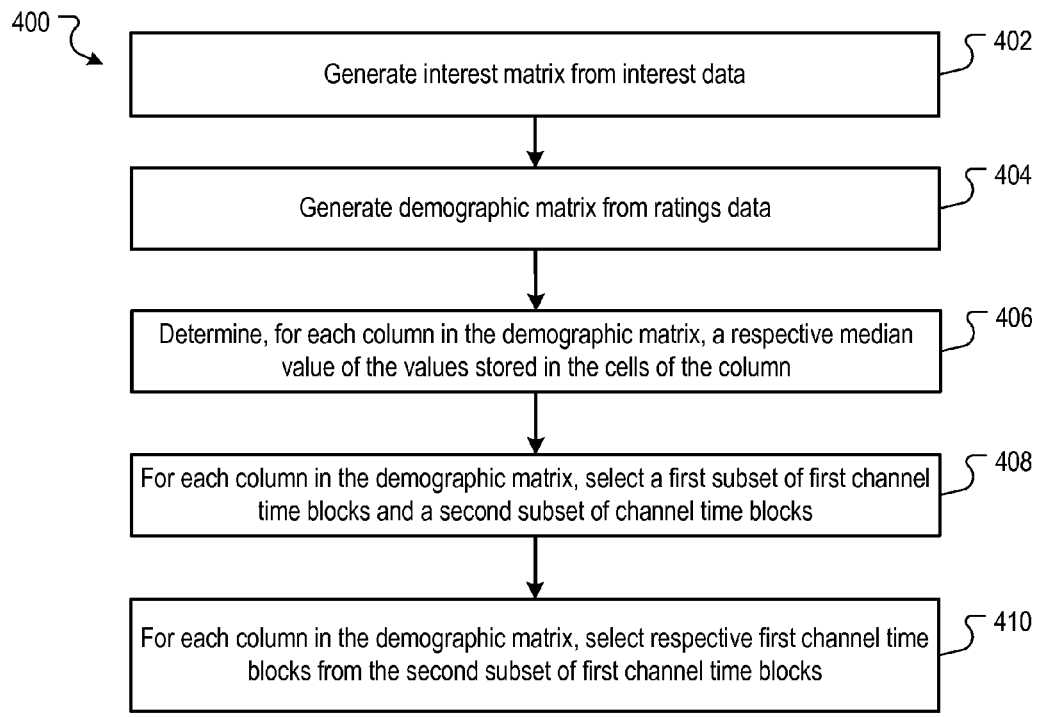
FIG. 4 is a flow diagram of an example process for selecting channel time blocks from which a demographic estimation is determined.

FIG. 4 is a flow diagram of an example process 400 for generating selecting channel time blocks from which a demographic estimation is determined. The process 400 can be implemented by a data processing apparatus and software stored on a computer storage apparatus that includes instructions executable by the data processing apparatus, and reduces the effect of regression to the means.

The process 400 generates the segment matrix from segment data (402) and the demographic matrix from ratings data (404), as described above. The process 400 then determines, for each column in the demographic matrix, a respective median value of the values stored in the cells of the column (406). For example, for the demographic characteristic $D_1$, a median of the values $V_{11}, V_{21} \ldots V_{j1}$ is determined; for the demographic characteristic $D_2$, a median of the values $V_{12}, V_{22} \ldots V_{j2}$ is determined, and so on.

For each column, the process 400 identifies first and second subsets of first channel time blocks. The first subset of first (rated) channel time blocks have values that meet a threshold with respect to the respective median value of the column, and the second subset of first (rated) channel time blocks have values that do not meet the threshold with respect to the respective median value of the column. For example, the threshold can be a portion of the channel time blocks having column values closest to the median value, e.g., 40%, 50%, 60%, or channels having values within a given percentage of the median value.

For each column, the process 400 selects respective first channel time blocks from the second subset of first channel time blocks (410). Because each column D has a different median value, and cell values for each column D differ, different channel time blocks for each column may be selected. For example, for the column $D_1$, the channel time block $CTB_1$ may be in the second set and may be selected. However, for the column $D_2$, the channel time bock $CTB_1$ may be in the first set and thus may not be selected.

Figure 5:
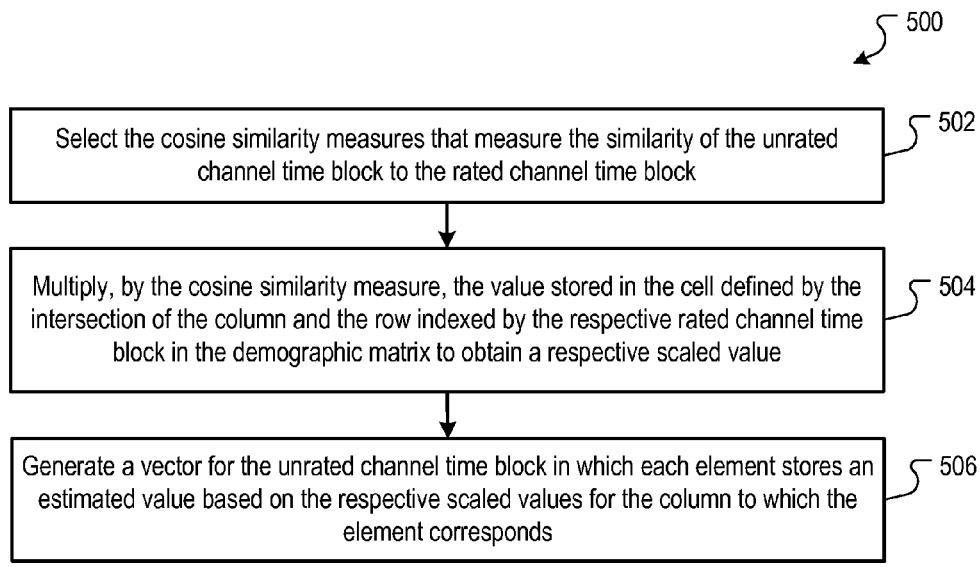
FIG. 5 is a flow diagram of an example process for estimating a demographic composition of an audience using a cosine similarity function.

FIG. 5 is a flow diagram of an example process 500 for estimating a demographic composition of an audience using a cosine similarity function. The process 500 can be implemented by a data processing apparatus and software stored on a computer storage apparatus that includes instructions executable by the data processing apparatus, and operations on the channel time blocks selected by the process 400.

For an unrated channel time block, the process 500 selects the cosine similarity measures that measure the similarity of the unrated channel time block to rated channel time blocks (502). For example, for the unrated channel time block $CTB_m$, the process 500 will select, for the demographic characteristic $D_1$, rated channel time blocks from the second set of rated channel time blocks determined for the characteristic $D_1$. Likewise, for the demographic characteristic $D_2$, rated channel time blocks from the second set of rated channel time blocks determined for the characteristic $D_2$, and so on.

The process 500 multiplies, by the cosine similarity measure, the value stored in the cell defined by the intersection of the column and the row indexed by the respective rated channel time block in the demographic matrix to obtain a respective scaled value (504). For example, for the demographic characteristic $D_1$, assume the channel time blocks $CTB_1$ and $CTB_3$ are selected, and that the respective similarity metrics are 0.98 and 0.92. Also assume that $CTB_1$ and $CTB_3$ refer to the same channel time block in both the segment matrix and the demographic matrix. Accordingly, the respective scaled values are $0.98*V_{11}$ and $0.92*V_{31}$. Likewise, assume for the demographic $D_2$ the channel time blocks $CTB_2$ and $CTB_6$ are selected, and that the respective similarity metrics are 0.91 and 0.93; the respective scaled values are $0.91*V_{22}$ and $0.93*V_{26}$.

The process generates a vector for the unrated channel time block in which each element storing an estimated value based on the respective scaled values for the column to which the element corresponds (506). The vector includes elements corresponding to the columns of the demographic matrix. For example, for the unrated channel time block $CTB_m$, the vector has k elements, corresponding to the k demographic segments in the demographic matrix. For element $D_1$ (k=1), the value is, for example, $(0.98*V_{11}+0.92*V_{31})/(0.98+0.92)$. Likewise, for the element $D_2$, the value is $(0.91*V_{22}+0.93*V_{26})/(0.91+0.93)$.

In an alternate implementation, each vector element is an average of the corresponding selected channel time block values of the demographic matrix. For example, the values of $D_1$ and $D_2$ are, respectively, $(V_{11}+V_{31})/2$ and $(V_{22}+V_{26})/2$.

Thus, when the process 500 is completed, a vector for the unrated channel time block is created. Each element of the vector stores an estimated value based on the respective scaled values for the column to which the element corresponds. Each estimated value is proportional to an estimated number of viewers having the demographic characteristic of the column for the scaled values.

In some implementations, for each demographic characteristic, only a subset of the rated channel time blocks from the second set of rated channel time blocks is selected for estimating the demographic characteristic of the unrated channel time block. For example, K respective first channel time blocks may be selected for each demographic characteristic, where K is a value that is the same for each second channel time block (e.g., 8, or 16, or 32 for each channel time block). The first channel time blocks that are selected from the second set are the rated channel time blocks having values that are closes to the median value of the demographic characteristic of the column.

In variations of this implementation, K can be individually selected for each unrated channel time block. For example, assume $CTB_{m-1}$ and $CTB_m$ are unrated channel time blocks; K for the channel time block $CTB_{m-1}$ may be 16, while K for the channel time block $CTB_m$ may be 32.

Figure 6:
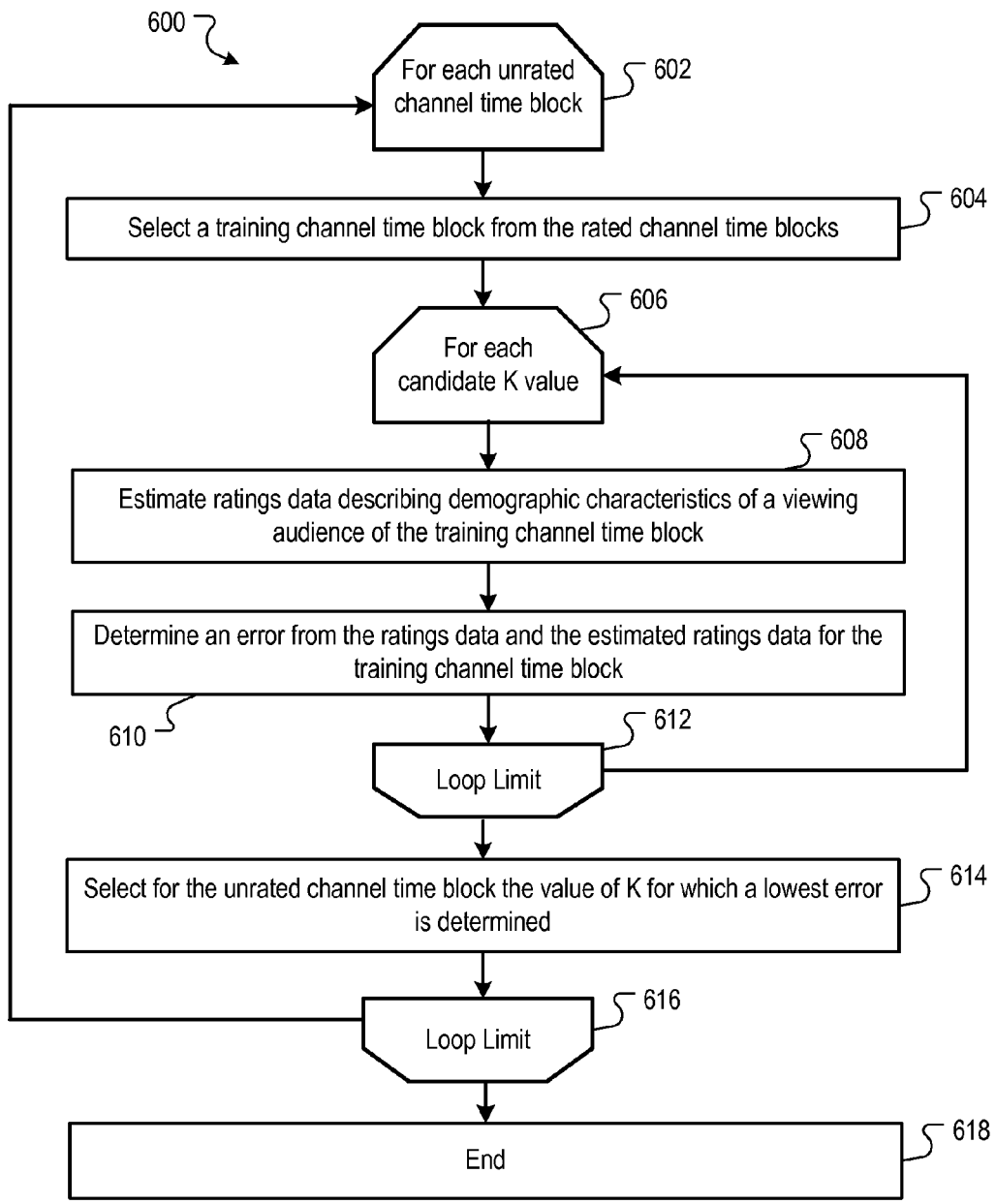
FIG. 6 is a flow diagram of an example process for determining, for each unrated channel time block, a corresponding number of rated channel time blocks to use for estimating demographic characteristics for the unrated channel time block.

To select a value of K for each unrated channel time block, the demographic estimation engine 114 trains on a corresponding training channel time block for each unrated channel time block. FIG. 6 is a flow diagram of an example process 600 for determining, for each unrated channel time block, a corresponding number of rated channel time blocks to use for estimating demographic characteristics for the unrated channel time block. The process 600 can be implemented by a data processing apparatus and software stored on a computer storage apparatus that includes instructions executable by the data processing apparatus.

For each unrated channel time block (602), the process selects a training channel time block from the rated channel time blocks (604). In some implementations, the selected training channel time block is a rated channel time block that is determined to be most similar to the unrated channel time block based on the respective similarity measures that measure the similarity of the unrated channel time block to each of the first channel time blocks. This results in a selection of a rated channel time block that is most similar to the unrated channel time block as the training channel time block.

For each value of a set of candidate values of K (606), the process 600 estimates ratings data describing demographic characteristics of a viewing audience of the training channel time block from the respective similarity measures and the demographic characteristics of K selected first channel time blocks (608). For example, the candidate values of K may range from 4-64, e.g., 4, 8, 16, 32 and 64. Accordingly, five estimations are generated, resulting in five vectors. The estimation can done by processes similar the processes 200-500 described above.

For each of the candidate values of K, the process 600 determines an error from the ratings data and the estimated ratings data for the training channel time block (610). Because the training channel time block is selected from rated channel time blocks, the actual ratings data of the training channel time block can be compared to the estimated ratings data generated for each value of K. For example, the RMS error of each estimated ratings data generated for each value of K can be determined.

If no additional values of K remained to be processed (612), the process 600 selects the value of K for which a lowest error is determined for the unrated channel time block. Once all the unrated channel time blocks are processed (616), the process 600 ends (618).

While the examples above are described in terms of the similarity of segments determined for an unrated channel time block to the segments determined for a set of rated channel time blocks, other data can also be used to determine similarities. For example, a similar methodology can be applied using a vector of household demographics (e.g., "household consisting of exactly two adult females aged between 18-29, but no adult males", etc.) for each channel time block.

Some ratings systems do not account for certainly measurements in the demographic data they provide. For example, a ratings provider may provide demographic profiles based on viewer counts of one or more. Accordingly, for very low counts, the demographic data may be very noisy. In some implementations, the demographic estimation engine precludes channel time blocks with relatively low viewer counts from being used to estimate demographics of unrated channel time blocks. In variations of this implementations, the demographic data for channel time blocks with relative low ratings counts can be replaced with estimated demographic data based on similarity measure to reduce demographic ratings noise.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 7:
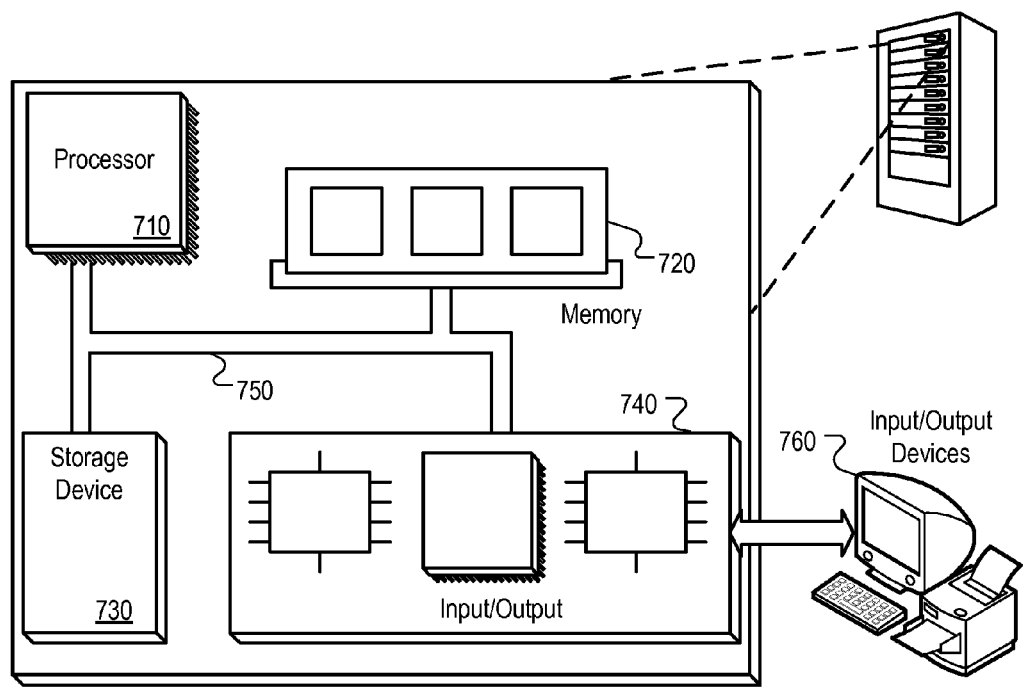
FIG. 7 is a block diagram of a programmable processing system.

An example of one such type of computer is shown in FIG. 7, which shows a block diagram of a programmable processing system (system). The system 700 that can be utilized to implement the systems and methods described herein. The architecture of the system 700 can, for example, be used to implement a computer client, a computer server, or some other computer device.

The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can, for example, include a hard disk device, an optical disk device, or some other large capacity storage device.

The input/output device 740 provides input/output operations for the system 700. In one implementation, the input/output device 740 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 760.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A system, comprising:
a data processing apparatus; and
software stored on a computer storage apparatus and comprising instructions executable by the data processing apparatus and upon such execution cause the data processing apparatus to perform operations comprising:
accessing ratings data describing, for each of a plurality of first channel time blocks, demographic characteristics of a viewing audience of the channel time block;
determining, for each of the demographic characteristics described by the ratings data, a respective central tendency value of the demographic characteristic;
identifying, for each of the demographic characteristics described by the ratings data, a subset of first channel time blocks, each first channel time block in the subset having a demographic characteristic value that meet a threshold with respect to the respective central tendency value of the demographic characteristic;

accessing segment data describing, for each of the plurality of first channel time blocks and a plurality of second channel time blocks for which demographic characteristics are not described by the ratings data, segment characteristics of a viewing audience of the channel time blocks, the segment data being data determined independently from the ratings data; and for each of the second channel time blocks:
 determining, from the segment data, respective similarity measures that measure the similarity of the second channel time block to each of the first channel time blocks in the subset of first channel time blocks; and
 determining estimated ratings data describing demographic characteristics of a viewing audience of the second channel time block from the respective similarity measures and the demographic characteristics of one or more of the first channel time blocks in the subset of first channel time blocks.

2. The system of claim 1, wherein the central tendency value is a median value.

3. The system of claim 1, wherein determining respective similarity measures comprises determining respective cosine similarity measures by comparing segment characteristics of the second channel time block to each of the first channel time blocks in the subset of first channel time blocks.

4. The system of claim 3, wherein determining estimated ratings data describing demographic characteristics of a viewing audience of the second channel time block comprises:
 for one or more of the demographic characteristics described by the ratings data:
  selecting, for each first channel time block in the subset of first channel time blocks for the demographic characteristic, the cosine similarity measure;
  multiplying, for each first channel time block in the subset of first channel time blocks for the demographic characteristic, the demographic characteristic value of the first channel time block by the cosine similarity measure of the first channel time block to obtain a respective scaled value; and
  generating an estimated demographic characteristic value for the second channel time block, the estimated demographic characteristic value corresponding to the demographic characteristic and being based on the respective scaled value obtained for each first channel time block in the subset of first channel time blocks for the demographic characteristic.

5. The system of claim 4, wherein identifying, for each of the demographic characteristics described by the ratings data, a subset of first channel time blocks comprises selecting K first channel time blocks, wherein K is a value that is predefined for each second channel time block.

6. The system of claim 5, wherein the value of K is selected for each second channel time block, and differs for at least two of the second channel time blocks.

7. The system of claim 6, wherein the instructions further cause the data processing apparatus to perform operations comprising:
 for each second channel time block:
  selecting, as a training channel time block, a first channel time block that is determined to be most similar to the second channel time block based on the respective similarity measures that measure the similarity of the second channel time block to each of the first channel time blocks;
  for each of a plurality of values of K, estimating ratings data describing demographic characteristics of a viewing audience of the training channel time block from the respective similarity measures and the demographic characteristics of K selected first channel time blocks;
  for each of the plurality of values of K, determining an error from the ratings data and the estimated ratings data for the training channel time block; and
  selecting, for the second channel time block, the value of K for which a lowest error is determined.

8. A computer implemented method performed by a data processing apparatus, comprising:
 accessing, by the data processing apparatus, ratings data describing, for each of a plurality of first channel time blocks, demographic characteristics of a viewing audience of the channel time block;
 determining, by the data processing apparatus and for each of the demographic characteristics described by the ratings data, a respective central tendency value of the demographic characteristic;
 identifying, by the data processing apparatus and for each of the demographic characteristics described by the ratings data, a subset of first channel time blocks, each first channel time block in the subset having a demographic characteristic value that meet a threshold with respect to the respective central tendency value of the demographic characteristic;
 accessing, by the data processing apparatus, segment data describing, for each of the plurality of first channel time blocks and a plurality of second channel time blocks for which demographic characteristics are not described by the ratings data, segment characteristics of a viewing audience of the channel time blocks, the segment data being data determined independently from the ratings data; and
 for each of the second channel time blocks:
  determining, by the data processing apparatus and from the segment data, respective similarity measures that measure the similarity of the second channel time block to each of the first channel time blocks in the subset of first channel time blocks; and
  determining, by the data processing apparatus, estimated ratings data describing demographic characteristics of a viewing audience of the second channel time block from the respective similarity measures and the demographic characteristics of one or more of the first channel time blocks in the subset of first channel time blocks.

9. The method of claim 8, wherein the central tendency value is a median value.

10. The method of claim 8, wherein determining respective similarity measures comprises determining respective cosine similarity measures by comparing segment characteristics of the second channel time block to each of the first channel time blocks in the subset of first channel time blocks.

11. The method of claim 10, wherein determining estimated ratings data describing demographic characteristics of a viewing audience of the second channel time block comprises:
 for one or more of the demographic characteristics described by the ratings data:
  selecting, for each first channel time block in the subset of first channel time blocks for the demographic characteristic, the cosine similarity measure;
  multiplying, for each first channel time block in the subset of first channel time blocks for the demographic characteristic, the demographic characteristic value of the first channel time block by the cosine similarity measure of the first channel time block to obtain a respective scaled value; and generating an estimated demographic characteristic value for the second channel time block, the estimated demographic characteristic value corresponding to the demographic characteristic and being based on the respective scaled value obtained for each first channel time block in the subset of first channel time blocks for the demographic characteristic.

12. The method of claim 11, wherein identifying, for each of the demographic characteristics described by the ratings data, a subset of first channel time blocks comprises selecting K first channel time blocks, wherein K is a value that is predefined for each second channel time block.

13. The method of claim 12, wherein the value of K is selected for each second channel time block, and differs for at least two of the second channel time blocks.

14. The method of claim 13, further comprising:
for each second channel time block:
selecting, as a training channel time block, a first channel time block that is determined to be most similar to the second channel time block based on the respective similarity measures that measure the similarity of the second channel time block to each of the first channel time blocks;
for each of a plurality of values of K, estimating ratings data describing demographic characteristics of a viewing audience of the training channel time block from the respective similarity measures and the demographic characteristics of K selected first channel time blocks;
for each of the plurality of values of K, determining an error from the ratings data and the estimated ratings data for the training channel time block; and
selecting, for the second channel time block, the value of K for which a lowest error is determined.

15. A non-transitory computer-readable medium comprising instructions that, when executed by a data processing apparatus, cause the data processing apparatus to perform operations, comprising:
accessing ratings data describing, for each of a plurality of first channel time blocks, demographic characteristics of a viewing audience of the channel time block;
determining, for each of the demographic characteristics described by the ratings data, a respective central tendency value of the demographic characteristic;
identifying, for each of the demographic characteristics described by the ratings data, a subset of first channel time blocks, each first channel time block in the subset having a demographic characteristic value that meet a threshold with respect to the respective central tendency value of the demographic characteristic;
accessing segment data describing, for each of the plurality of first channel time blocks and a plurality of second channel time blocks for which demographic characteristics are not described by the ratings data, segment characteristics of a viewing audience of the channel time blocks, the segment data being data determined independently from the ratings data; and
for each of the second channel time blocks:
determining, from the segment data, respective similarity measures that measure the similarity of the second channel time block to each of the first channel time blocks in the subset of first channel time blocks; and determining estimated ratings data describing demographic characteristics of a viewing audience of the second channel time block from the respective similarity measures and the demographic characteristics of one or more of the first channel time blocks in the subset of first channel time blocks.

16. The computer-readable medium of claim 15, wherein determining respective similarity measures comprises determining respective cosine similarity measures by comparing segment characteristics of the second channel time block to each of the first channel time blocks in the subset of first channel time blocks.

17. The computer-readable medium of claim 16, wherein determining estimated ratings data describing demographic characteristics of a viewing audience of the second channel time block comprises:
for one or more of the demographic characteristics described by the ratings data:
selecting, for each first channel time block in the subset of first channel time blocks for the demographic characteristic, the cosine similarity measure;
multiplying, for each first channel time block in the subset of first channel time blocks for the demographic characteristic, the demographic characteristic value of the first channel time block by the cosine similarity measure of the first channel time block to obtain a respective scaled value; and
generating an estimated demographic characteristic value for the second channel time block, the estimated demographic characteristic value corresponding to the demographic characteristic and being based on the respective scaled value obtained for each first channel time block in the subset of first channel time blocks for the demographic characteristic.

18. The computer-readable medium of claim 17, wherein identifying, for each of the demographic characteristics described by the ratings data, a subset of first channel time blocks comprises selecting K first channel time blocks, wherein K is a value that is predefined for each second channel time block.

19. The computer-readable medium of claim 18, wherein the value of K is selected for each second channel time block, and differs for at least two of the second channel time blocks.

20. The computer-readable medium of claim 19, wherein the instructions further cause the data processing apparatus to perform operations comprising:
for each second channel time block:
selecting, as a training channel time block, a first channel time block that is determined to be most similar to the second channel time block based on the respective similarity measures that measure the similarity of the second channel time block to each of the first channel time blocks;
for each of a plurality of values of K, estimating ratings data describing demographic characteristics of a viewing audience of the training channel time block from the respective similarity measures and the demographic characteristics of K selected first channel time blocks;
for each of the plurality of values of K, determining an error from the ratings data and the estimated ratings data for the training channel time block; and
selecting, for the second channel time block, the value of K for which a lowest error is determined.

* * * * *